US008351071B2

(12) United States Patent
Akimoto

(10) Patent No.: US 8,351,071 B2
(45) Date of Patent: Jan. 8, 2013

(54) PRINT CONTROL APPARATUS, PRINT APPARATUS, PRINT SYSTEM, PRINT METHOD, AND STORAGE MEDIUM

(75) Inventor: Yasuhiro Akimoto, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 11/613,711

(22) Filed: Dec. 20, 2006

(65) Prior Publication Data

US 2007/0160403 A1 Jul. 12, 2007

(30) Foreign Application Priority Data

Jan. 10, 2006 (JP) ................................. 2006-002942
Jun. 13, 2006 (JP) ................................. 2006-163860

(51) Int. Cl.
*G06F 15/00* (2006.01)
*G06F 3/12* (2006.01)
*G06K 1/00* (2006.01)
*G06K 15/02* (2006.01)
*G06K 15/00* (2006.01)

(52) U.S. Cl. ........ 358/1.4; 358/1.6; 358/1.11; 358/1.13; 358/1.18

(58) Field of Classification Search ................. 358/1.13, 358/1.15, 1.2; 400/82; 347/16, 2, 14
See application file for complete search history.

(56) References Cited

U.S. PATENT DOCUMENTS 6,145,950 A * 11/2000 Ohtsuka et al. ................. 347/15
6,151,037 A * 11/2000 Kaufman et al. ................. 347/2
6,582,039 B2 * 6/2003 Johnson et al. ................... 347/3
6,725,770 B2 * 4/2004 Maeda ......................... 101/129
6,798,530 B1 * 9/2004 Buckley et al. .............. 358/1.13
6,839,524 B2 * 1/2005 Yamaguchi et al. .............. 399/2
7,027,172 B1 * 4/2006 Parulski et al. .............. 358/1.15
7,070,250 B2 * 7/2006 Lester et al. ...................... 347/4
7,101,003 B2 * 9/2006 Ferguson et al. ................. 347/2
7,274,883 B2 * 9/2007 Evans .............................. 399/2
7,483,046 B2 * 1/2009 Lee et al. ...................... 347/172
2003/0021606 A1 1/2003 Johnson et al.
2003/0117646 A1 6/2003 Akiyama
2004/0125395 A1 * 7/2004 Onishi ......................... 358/1.13
2004/0239959 A1 * 12/2004 Yada et al. ..................... 358/1.2
2006/0139674 A1 * 6/2006 Oshima ........................ 358/1.13
2007/0064254 A1 * 3/2007 Kim et al. .................... 358/1.13

FOREIGN PATENT DOCUMENTS

EP 1315075 A2 5/2003
JP 7-271531 A 10/1995
JP 9-69034 A 3/1997
JP 2003-118174 A 4/2003
JP 2003-154737 A 5/2003

* cited by examiner

*Primary Examiner* — Twyler Haskins
*Assistant Examiner* — Jonathan Beckley
(74) *Attorney, Agent, or Firm* — Canon USA, Inc., IP Division

(57) ABSTRACT

A print control apparatus enables a user to select an arbitrary print mechanism among a plurality of print mechanisms of a print apparatus. To this end, the print control apparatus can display a screen showing two or more print mechanisms usable in the print apparatus. The print control apparatus can determine an optimum print mechanism based on image contents and print conditions.

7 Claims, 17 Drawing Sheets

| COMBINATION | OBJECT DATA (OR INFORMATION) PORTION |
|---|---|
| IJ PRINT + DYE SUBLIMATION PRINT | IMAGE PORTION : DYE SUBLIMATION PRINT<br>ATTRIBUTE INFORMATION PORTION : IJ PRINT |
| LASER PRINT + IJ PRINT | ⋮ |
| LASER PRINT + DYE SUBLIMATION PRINT | ⋮ |

PRINT CONTROL APPARATUS, PRINT APPARATUS, PRINT SYSTEM, PRINT METHOD, AND STORAGE MEDIUM

BACKGROUND OF THE INVENTION

1. Field of the Invention

The present invention relates to a print technique using a printer having a plurality of print mechanisms.

2. Description of the Related Art

A digital camera or other recording/playback apparatus can be directly connected, or integrated, to a printer to print a recorded image.

As discussed in Japanese Patent Application Laid-open No. 2003-118174, a hybrid printer possesses plural print mechanisms (e.g., a color print mechanism and a monochrome print mechanism). The hybrid printer can automatically identify a monochrome page and a color page and perform a print operation by selectively using an optimum print mechanism for the print of each page.

However, the conventional digital cameras or other print control devices do not allow users to arbitrarily select a desired print mechanism. Users cannot select a proper print mechanism corresponding to requested print conditions.

For example, to print a recorded image, a camera may be connected to a hybrid printer having plural printer units. In this case, the hybrid printer identifies the type of print data (i.e., monochrome or color), and automatically determines a printer unit to be used. Therefore, a user of the camera cannot designate an intended printer unit to be used for a print operation.

In this manner, irrespective of the type of data to be printed, the conventional systems do not allow users to designate a printer unit of the hybrid printer. As a result, usability of the hybrid printer is not good.

More specifically, consumable materials including print papers and inks (toners) cannot be consistently used and accordingly management of the consumable materials is difficult. Moreover, predicting an output result is difficult. The print operation may not start smoothly if the action state of each printer unit of the hybrid printer is not proper.

Additionally, obtaining a desired print result is difficult. A selected printer may not correspond to the format of print data. The output results may not be compared in the same printer.

SUMMARY OF THE INVENTION

Exemplary embodiments of the present invention are directed to a technique capable of solving or at least mitigating the aforementioned problems.

According to an aspect of the present invention, a print control apparatus controls a print operation of a print apparatus having a plurality of print mechanisms. A recognition unit recognizes two or more print mechanisms usable in the print apparatus. A selection unit selects a print mechanism among the print mechanisms usable in the print apparatus recognized by the recognition unit. A setting unit sets print conditions based on the print mechanism selected by the selection unit.

According to another aspect of the present invention, a method for controlling a print operation of a print apparatus having a plurality of print mechanisms, includes: recognizing two or more print mechanisms usable in the print apparatus; selecting a print mechanism among the recognized print mechanisms usable in the print apparatus; and setting print conditions based on the selected print mechanism.

According to another aspect of the present invention, a print apparatus performing a print operation, includes a print mechanism information providing unit configured to provide information relating to two or more usable print mechanisms to a print control apparatus; and a print unit configured to perform a print operation using a print mechanism which is selected among the two or more usable print mechanisms and determined by the print control apparatus.

According to yet another aspect of the present invention, a print control apparatus includes a recognition unit configured to recognize two or more print mechanisms usable in the print apparatus; a setting unit configured to set a print object image and print conditions applied to the image; and a selection unit configured to select a print mechanism among the print mechanisms usable in the print apparatus which are recognized by the recognition unit, according to the contents of the print object image or the print conditions.

Moreover, according to still another aspect of the present invention, a print apparatus includes an input section configured to input image data and character information relating to the image data; a first print section configured to performing a print operation according to a dye sublimation system; a second print section configured to performing a print operation according to an inkjet system; and a control section configured to control the first print section or the second print section to print the image data and the character information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
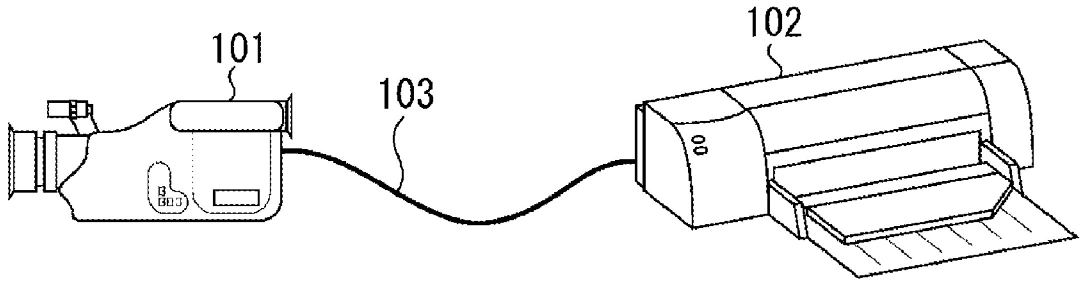
FIG. 1 illustrates a print system including a camera-integrated vide tape recorder (VTR) and a hybrid printer according to an exemplary embodiment.

The following description of exemplary embodiments is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments will now herein be described in detail below with reference to the drawings.

First Exemplary Embodiment

FIG. 1 illustrates a print system including a camera-integrated vide tape recorder (VTR) and a hybrid printer. A camera-integrated VTR 101 is equipped with a liquid crystal monitor and a communication section, and is operable according to a digital VTR standard.

A hybrid printer 102 includes a plurality of print sections capable of printing a recorded image in a visible state. The camera-integrated VTR 101 and the hybrid printer 102 are connected via a communication cable 103. According to the arrangement shown in FIG. 1, the camera-integrated VTR 101 can transmit and receive instructions and data to and from the hybrid printer 102. The hybrid printer 102 can print an image recorded by the camera-integrated VTR 101.

Although not shown in the drawings, the camera-integrated VTR 101 can be connected to the hybrid printer 102 by a wireless communication system to communicate with each other.

An exemplary embodiment in the following description may be described based on a camera-integrated VTR. However, the present invention is not limited to a camera-integrated VTR and can be similarly applied to a digital camera regardless of the availability of a movie shooting function.

Moreover, the present invention can be applied to any image playback apparatus having a printer control function. For example, the present invention can be applied to a portable terminal (e.g., a portable phone or a PDA), a video playback device (e.g., a DVD player), and a video recorder or other stationary video recording/playback apparatus.

Figure 2:
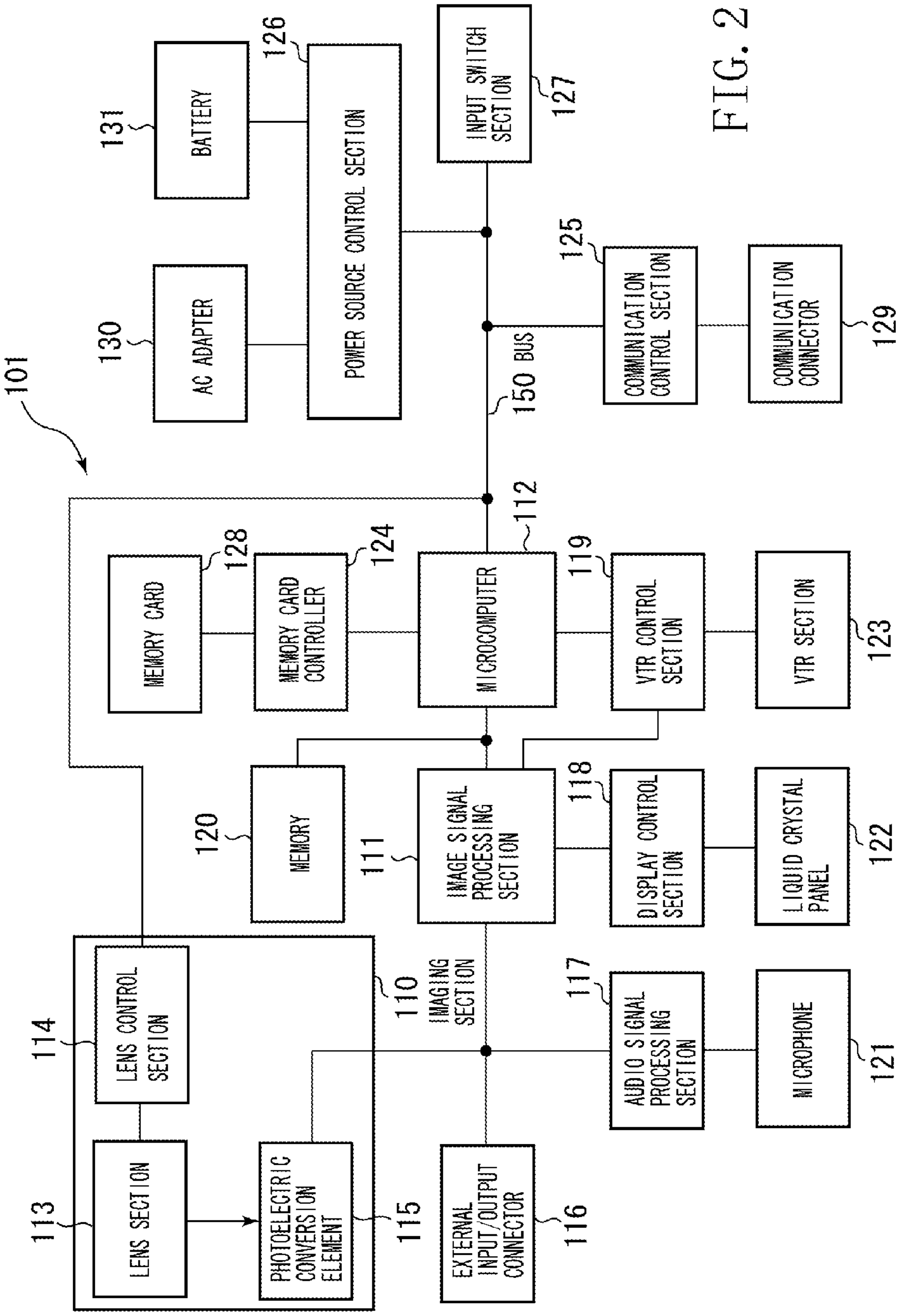
FIG. 2 is a block diagram illustrating functional sections of the camera-integrated VTR according to an exemplary embodiment.

FIG. 2 is a block diagram illustrating functional sections of the camera-integrated VTR 101, including various blocks or components that can mutually transmit/receive control signals and data via a system bus (including an address bus and a data bus) 150. A microcomputer 112 can control the entire operation of the camera-integrated VTR 101.

An image signal processing section 111 can process an image signal supplied from a photoelectric conversion element 115 that can convert an image of a shooting subject into an electric signal, an image signal entered from an external input/output connector 116, and an audio signal entered from a microphone 121 and processed by an audio signal processing section 117. Furthermore, the image signal processing section 111 can process an image signal supplied to a display control section 118 that can control an image displayed on a liquid crystal panel 122.

A lens section 113 can be controlled by a lens control section 114. An imaging section 110 includes the lens section 113, the lens control section 114, and the photoelectric conversion element 115. A memory 120 is a temporary storage of data. A power source control section 126 can control electric power supplied to an AC adapter 130 and a battery 131. An input switch section 127 includes a power source button, a shooting start button, a playback image selection button, and other various buttons.

A communication control section 125 can control communications between the microcomputer 112 and an external device (e.g., a printer or a PC) connected via a communication connector 129. A VTR control section 119 can control a VTR section 123 and control recording and playback of moving image and audio data. A memory card controller 124 can control writing/reading of data into/from a memory card 128.

Figure 3:
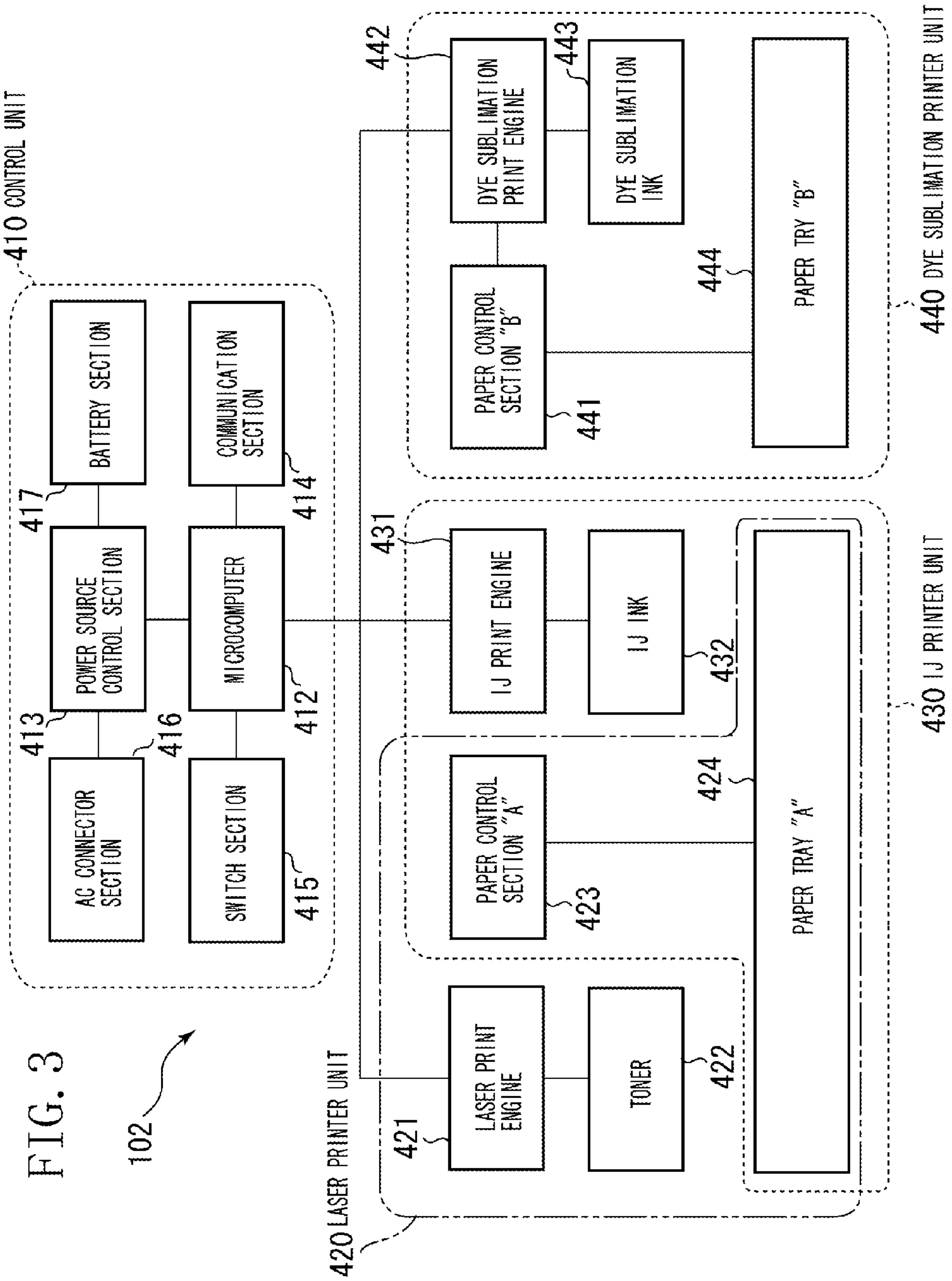
FIG. 3 is a block diagram illustrating functional sections of the hybrid printer according to an exemplary embodiment.

FIG. 3 is a block diagram illustrating functional sections of the hybrid printer 102. The hybrid printer 102 shown in FIG. 3 includes, in its body, a laser printer mechanism, an inkjet (hereinafter, referred to as "IJ") printer mechanism, and a dye sublimation printer (dye sublimation printer) mechanism. The hybrid printer 102 can communicate with the print control apparatus (e.g., camera-integrated VTR) and inform that the aforementioned three types of printer mechanisms are available. Furthermore, the hybrid printer 102 has the capability of performing printing based on a print mechanism and print conditions (print settings) designated from the print control apparatus.

As shown in FIG. 3, the hybrid printer 102 includes a control unit 410, a laser printer unit 420, an IJ printer unit 430, and a dye sublimation printer unit 440. The control unit 410 can control the laser printer unit 420, the IJ printer unit 430, and the dye sublimation printer unit 440.

The control unit 410 includes a microcomputer 412, a power source control section 413, a communication section 414, a switch section 415, an AC connector section 416, and a battery section 417. The power source control section 413 can control AC power supplied from the connector section 416 and DC power supplied from the battery section 417. The microcomputer 412 can control the entire operation of the hybrid printer 102.

The switch section 415 includes operation buttons that enable a user to input information, data, and instructions into the microcomputer 412. The communication section 414 enables the control unit 410 to communicate with other devices via a cable connection or a wireless communication connection to transmit/receive instructions and data to/from other devices. Thus, the hybrid printer 102 can print images recorded in other devices that the control unit 410 can communicate with.

The laser printer unit 420 includes a laser print engine 421 that can control toner 422 and a paper control section "A" 423 and can control the entire operation of the laser printer unit 420. The paper control section "A" 423 can control a paper tray "A" 424 for supplying and discharging papers.

The IJ printer unit 430 includes an IJ print engine 431 that can control an IJ ink 432 and the paper control section "A" 423 and can control the entire operation of the IJ printer unit 430. The paper control section "A" 423 and the paper tray "A" 424 cooperatively form a function block that can be commonly used by the laser printer unit 420 and the IJ printer unit 430.

The dye sublimation printer unit 440 includes a dye sublimation print engine 442 that can control dye sublimation ink 443 and a paper control section "B" 441 and can control the entire operation of the dye sublimation print unit 440. The paper control section "B" 441 can control a paper tray "B" 444 for supplying and discharging papers.

Figure 4:
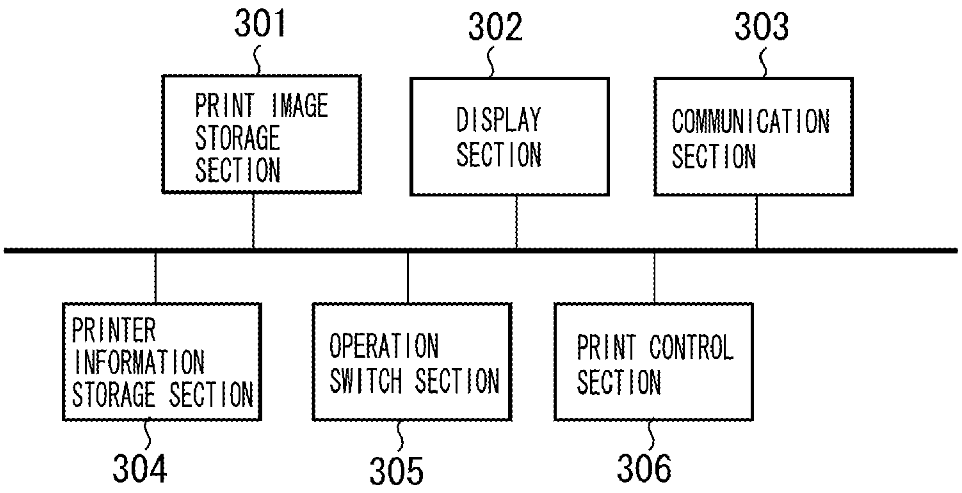
FIG. 4 is a block diagram illustrating sections of the print control apparatus according to an exemplary embodiment.

FIG. 4 is a block diagram illustrating sections of the camera-integrated VTR 101 (i.e., the print control apparatus) including microcomputer 112 that controls print actions. A printer information storage section 304, corresponding to part of the memory 120 shown in FIG. 2, can store printer information (i.e., plural print mechanisms) of the hybrid printer 102 which can be obtained through communications with the hybrid printer 102. The microcomputer 112 of the camera-integrated VTR 101 can recognize the print mechanisms of the hybrid printer 102 based on the printer information.

An operation switch section 305 (corresponding to the input switch section 127 shown in FIG. 2) enables a user to operate the print control apparatus. A display section 302 (corresponding to the liquid crystal panel 122 and the display control section 118 shown in FIG. 2) can display the printer information and enables a user to select and determine a desirable print mechanism. The selected print mechanism can be notified to the hybrid printer 102 so that the hybrid printer 102 can execute a printing operation.

A print control section 306, corresponding to the microcomputer 112, can transmit the determined print mechanism and an image stored in a print image storage section 301, via a communication section 303, to the hybrid printer 102. The print image storage section 301 corresponds to part of the memory 120 or the memory card 128 shown in FIG. 2. The communication section 303 corresponds to the communication control section 125 and the communication connector 129 shown in FIG. 2.

Figure 5:
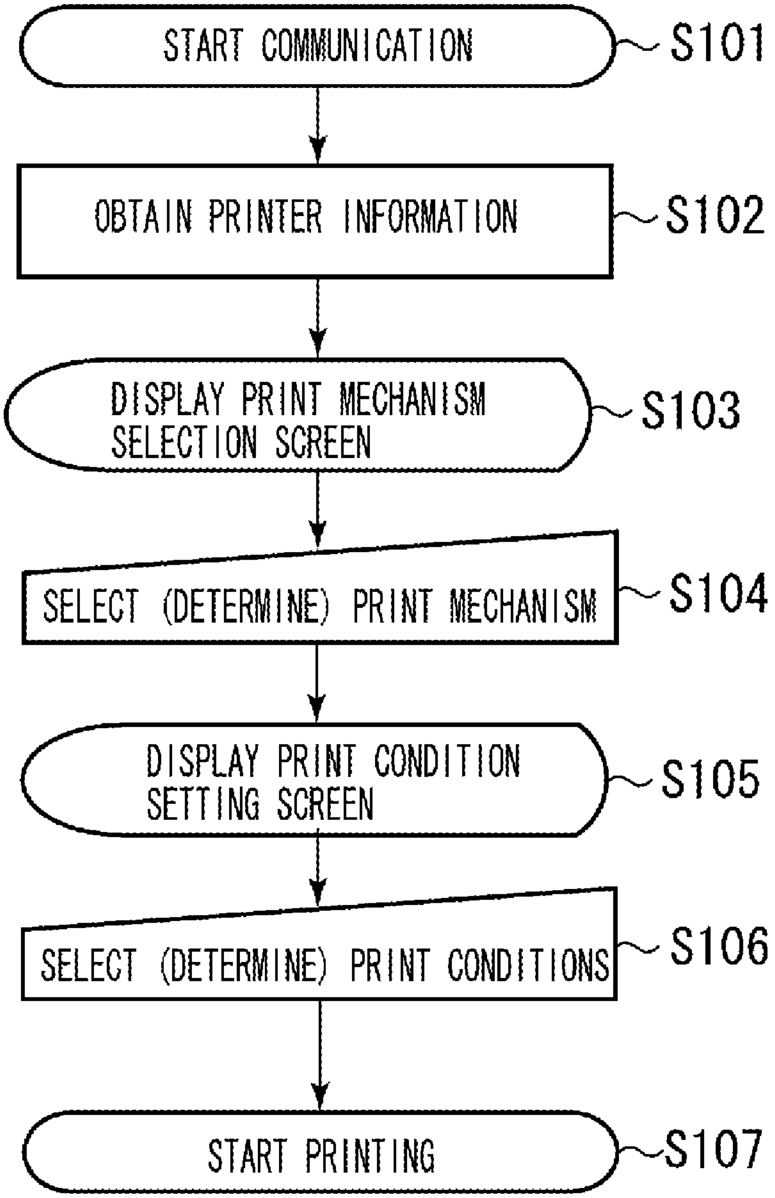
FIG. 5 is a flowchart showing exemplary processing of a microcomputer (print control section) that can control the print control apparatus according to an exemplary embodiment.

FIG. 5 is a flowchart showing exemplary processing of the microcomputer 112 (i.e., print control section 306) that can control the print control apparatus. First, step S101 of FIG. 5 is communication start processing including connection of a communication cable, activation of the print control apparatus and the hybrid printer, and selection of communication mode.

In step S102, the print control apparatus communicates with the hybrid printer 102 to obtain printer information including usable print mechanisms (e.g., laser print, inkjet (IJ) print, and dye sublimation print) of the hybrid printer 102 and print conditions (print settings) for each print mechanism. The printer information storage section 304 stores the obtained printer information.

The print conditions (print settings) include print image information (file format, file size, etc), print number of copies, print paper size (print range), print position (layout), print quality (image quality), print paper type (paper quality), ink type, print effect (special effect), and image processing information.

The print control apparatus creates a print condition setting screen based on the information relating to the aforementioned print conditions so that a user can arbitrarily set print conditions. The print control apparatus can automatically determine the print conditions.

The print control section 306 (the microcomputer 112) can recognize the print mechanisms usable in the hybrid printer 102 based on the printer information stored in the printer information storage section 304. The print control section 306 (the microcomputer 112) can also recognize the capability of each print mechanism and print conditions that can be set.

Alternatively, the print control apparatus can obtain a predetermined code inherent to the hybrid printer 102 to identify the connected hybrid printer 102 and obtain printer information from its own storage section (e.g., memory).

Figure 6:
FIG. 6 illustrates an exemplary print mechanism selection screen according to an aspect of the present invention.

In step S103, the print control apparatus displays print mechanisms usable in the connected hybrid printer 102 (refer to FIG. 6). In step S104, the print control apparatus selects and determines a print mechanism to be used based on user's preference. A user of the print control apparatus can select a desirable print mechanism while viewing an exemplary screen shown in FIG. 6.

Figure 7:
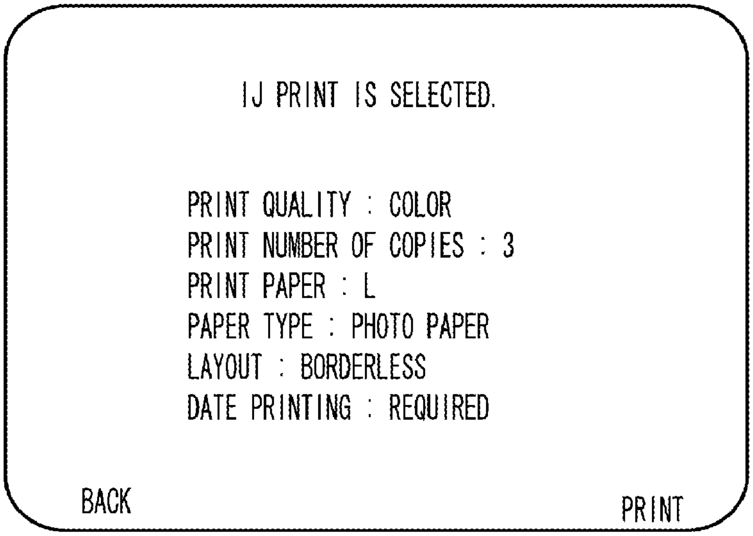
FIG. 7 illustrates an exemplary print setting screen according to an aspect of the present invention.

In step S105, the print control apparatus displays a print condition setting screen that enables a user to designate print conditions for the selected print mechanism (refer to FIG. 7). In step S106, the print control apparatus sets print conditions based on user's preference. A user of the print control apparatus can select desirable print conditions while viewing an exemplary screen shown in FIG. 7.

In step S107, the print control apparatus transmits, to the hybrid printer 102, the determined print mechanism, print conditions (print settings), and print object images (or documents). And, the print control apparatus requests the hybrid printer 102 to perform a print operation.

Figure 8:
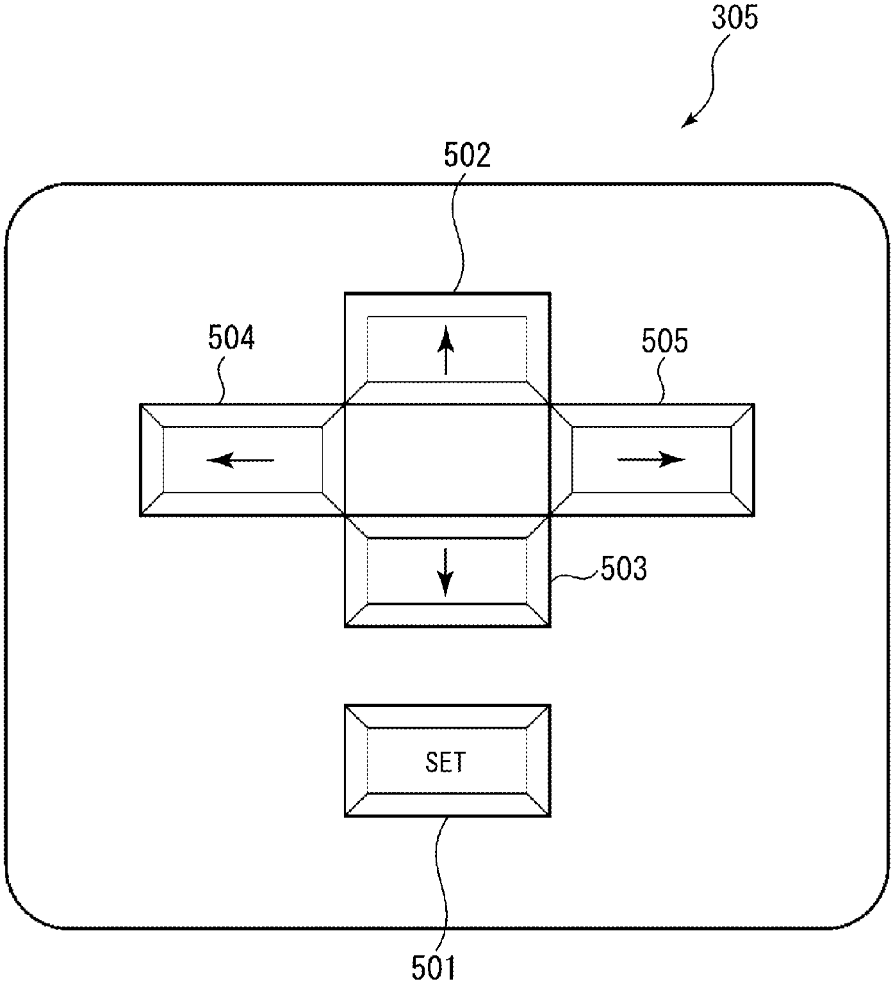
FIG. 8 illustrates an exemplary operation switch section of the print control apparatus according to an aspect of the present invention.

FIG. 8 illustrates an example of the operation switch section 305 of the print control apparatus. The operation switch section 305 shown in FIG. 8 includes a SET button 501 that a user can press to determine in step S104 and step S106 shown in FIG. 5. Furthermore, the operation switch section 305 includes four direction buttons 502 through 505 that a user can press to shift a UI cursor on a display screen in a direction indicated on the button for the selection in step S104, step S105, and step S106 shown in FIG. 5.

Moreover, in step S106 of FIG. 5, a user can press the button 504 or 505 to select other value or option in a state that the cursor is put on each setting item shown in the screen of FIG. 7. The print control apparatus displays other setting values or options in accordance with the user's designation through the direction buttons 504 and 505.

A user of the print control apparatus may want to print an index including plural images on a piece of paper. In this case, it is useful to select the IJ print system. On the other hand, when a user of the print control apparatus requires an ordinary print of an image on a paper, the user can select the dye sublimation print system.

As described above, the first exemplary embodiment enables a user of the print control apparatus to adaptively select a print system according to the type of print.

Second Exemplary Embodiment

Compared to the first exemplary embodiment using the camera-integrated VTR as an example of the print control apparatus, a second exemplary embodiment is characterized in that a communication device (e.g., a portable phone) is used as an example of the print control apparatus. In the following description, differences between the second exemplary embodiment and the first exemplary embodiment will be chiefly described.

Figure 9:
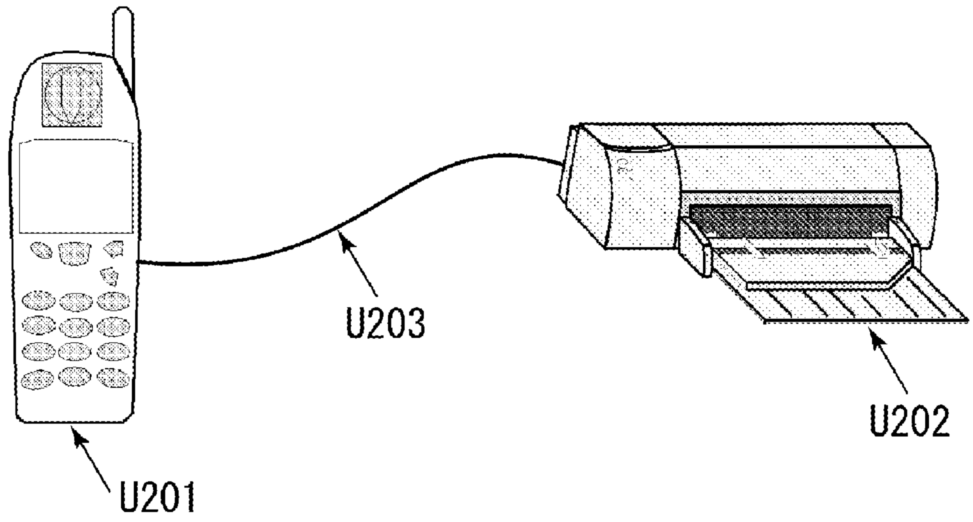
FIG. 9 illustrates a print system including a communication device (e.g., portable phone) and a hybrid printer according to an exemplary embodiment.

FIG. 9 illustrates a print system including a communication device (e.g., portable phone) U201 and a hybrid printer U202 in accordance with an exemplary embodiment. The hybrid printer U202 includes a plurality of print sections capable of printing a recorded image in a visible state. The communication device U201 and the hybrid printer U202 are connected via a communication cable U203. According to the arrangement shown in FIG. 9, the communication device U201 can transmit and receive instructions and data to and from the hybrid printer U202. The hybrid printer U202 can print an image recorded by the communication device U201.

Although not shown in the drawings, the communication device U201 can be connected to the hybrid printer U202 by a wireless communication system to communicate with each other.

Figure 10:
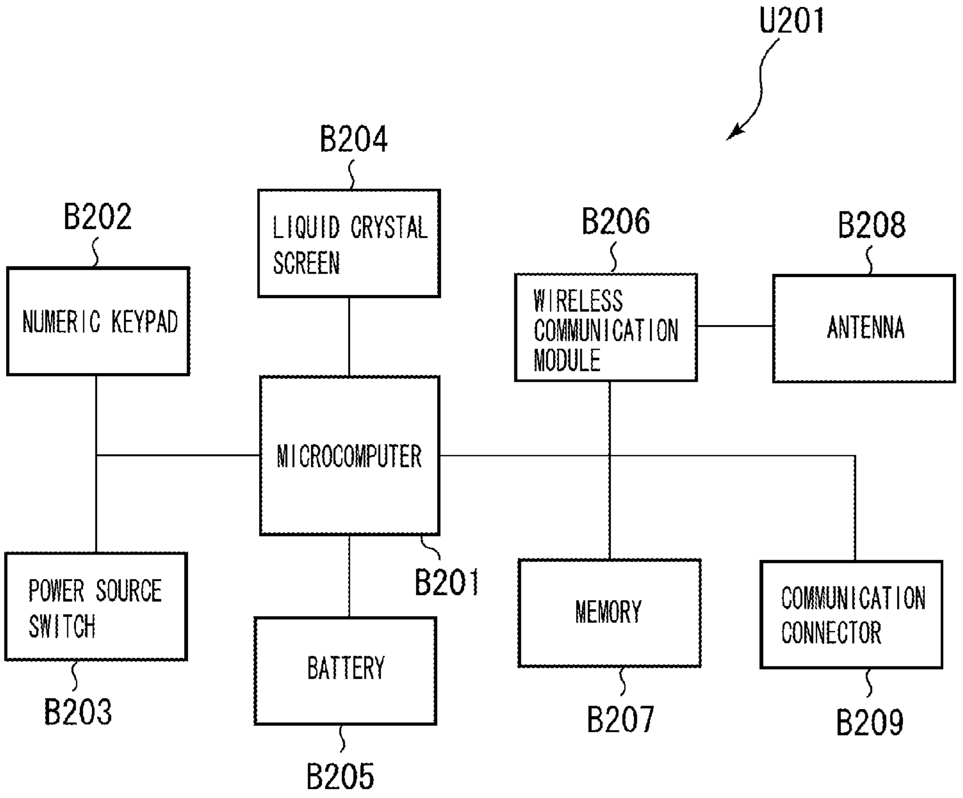
FIG. 10 is a block diagram illustrating functional sections of a communication device (portable phone) according to an exemplary embodiment.

FIG. 10 is a block diagram illustrating functional sections of a communication device (e.g., a portable phone) U201 in accordance with an exemplary embodiment. The communication device U201 shown in FIG. 10 includes a microcomputer B201, a numeric keypad B202, a power source switch B203, a liquid crystal screen B204, a battery B205, a wireless communication module B206, a memory B207, an antenna B208, and a communication connector B209.

The microcomputer B201 can control the entire operation of the communication device U201. The numeric keypad B202 enables a user to input figures, letters, and symbols. The power source switch B203 can turn on and off an electric power source. The liquid crystal screen B204 can function as a display monitor. The battery B205 is an electric power source for activating the communication device U201. The wireless communication module B206 is a circuit necessary for performing wireless communications via the antenna B208. The memory B207 is a temporary storage of data. The communication connector B209 is used for cable communication with the hybrid printer U202.

Third Exemplary Embodiment

Compared to the above-described exemplary embodiments selecting only one print mechanism of the print control apparatus, a third exemplary embodiment is characterized in that plural print mechanisms of the print control apparatus can be selected. In the following description, differences between the third exemplary embodiment and the above-described exemplary embodiments will be chiefly described.

Figure 11:
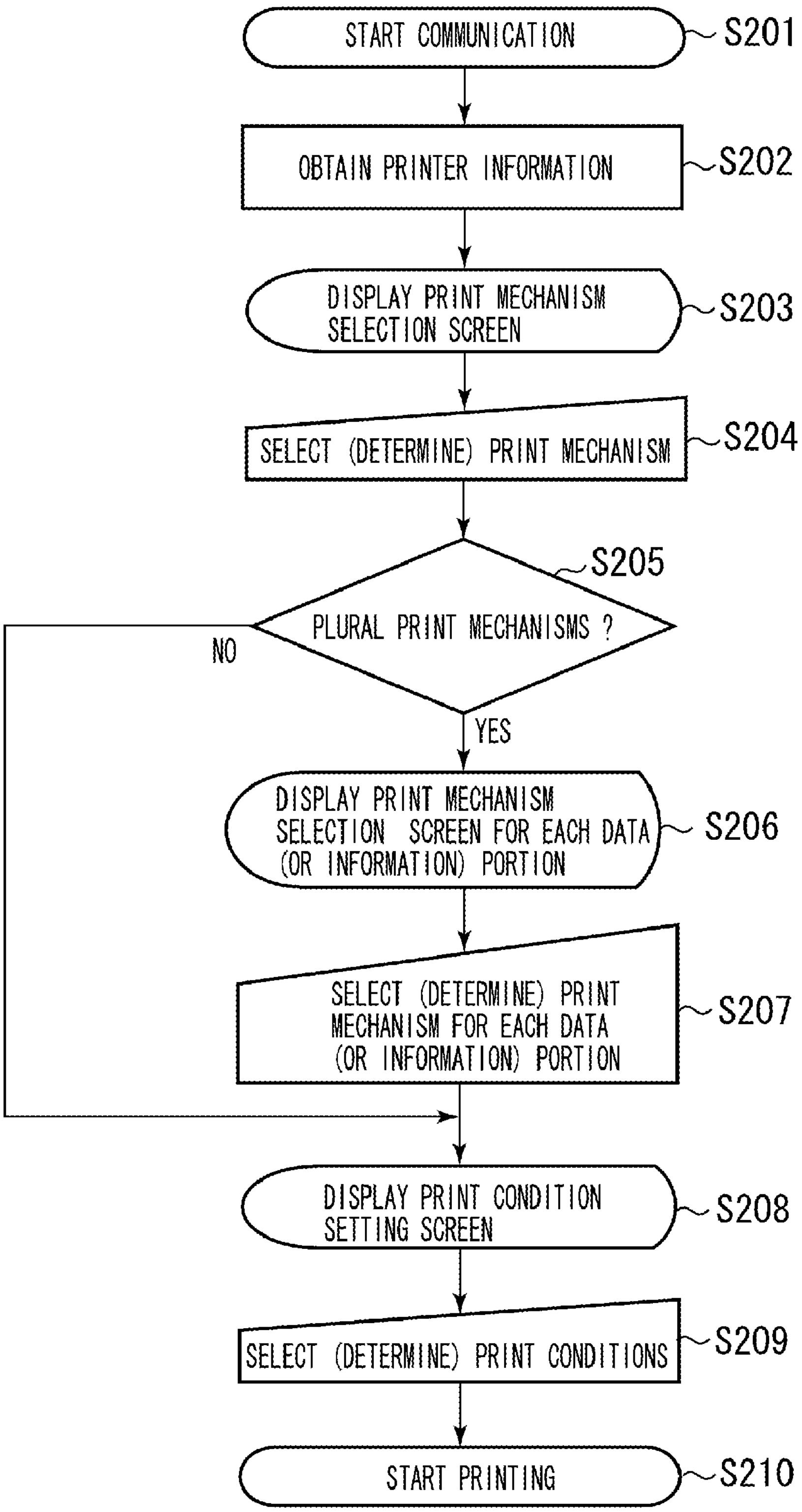
FIG. 11 is a flowchart showing exemplary processing of a microcomputer (print control section) that can control the print control apparatus according to an exemplary embodiment.

FIG. 11 is a flowchart showing exemplary processing of a microcomputer (print control section) that can control the print control apparatus in accordance with an exemplary embodiment. First, step S201 of FIG. 11 is communication start processing including connection of a communication cable, activation of the print control apparatus and the hybrid printer, and selection of communication mode.

In step S202, the print control apparatus communicates with the hybrid printer to obtain printer information including usable print mechanisms (e.g., laser print, IJ print, and dye sublimation print) of the hybrid printer and print conditions (print settings) for each print mechanism.

Alternatively, the print control apparatus can obtain a predetermined code inherent to the hybrid printer to identify the connected hybrid printer and obtain printer information from its own storage section (e.g., memory).

Figure 12:
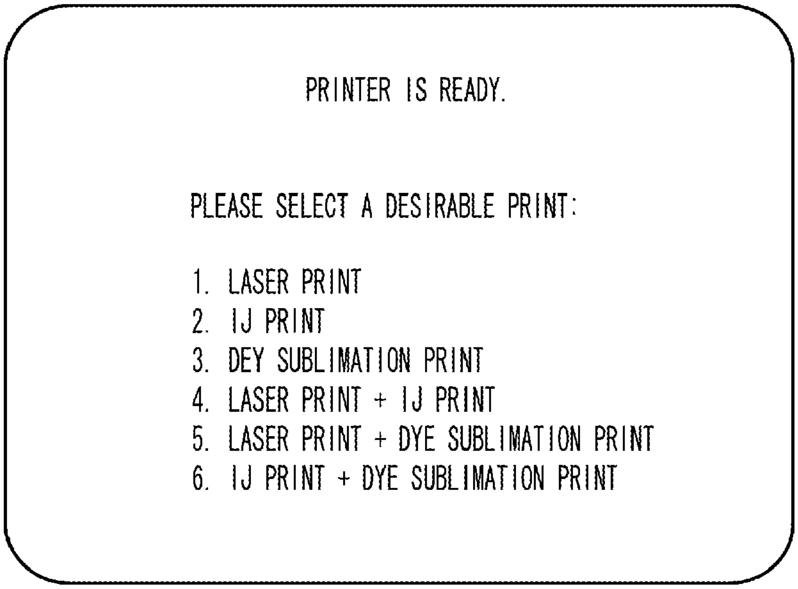
FIG. 12 illustrates an exemplary print mechanism selection screen according to an aspect of the present invention.

In step S203, the print control apparatus displays the print mechanisms usable in the connected hybrid printer (refer to FIG. 12). As shown in FIG. 12, the print control apparatus according to the third exemplary embodiment can display combinations of print mechanisms usable in the hybrid printer, based on the printer information obtained in step S202.

To simplify the description of the third exemplary embodiment, the print control apparatus displays combinations of two print mechanisms usable in the hybrid printer. However, it is not intended to narrowly limit the exemplary embodiment of the present invention.

In step S204, the print control apparatus selects and determines a print mechanism to be used based on user's preference. A user of the print control apparatus can select a desirable print mechanism while viewing an exemplary screen shown in FIG. 12.

In step S205, the print control apparatus determines whether plural print mechanisms are selected and determined in step S204. If plural print mechanisms are selected (i.e., YES in step S205), the processing flow proceeds to step S206. When only one print mechanism is selected (i.e., NO in step S205), the processing flow proceeds to step S208.

Figure 13:
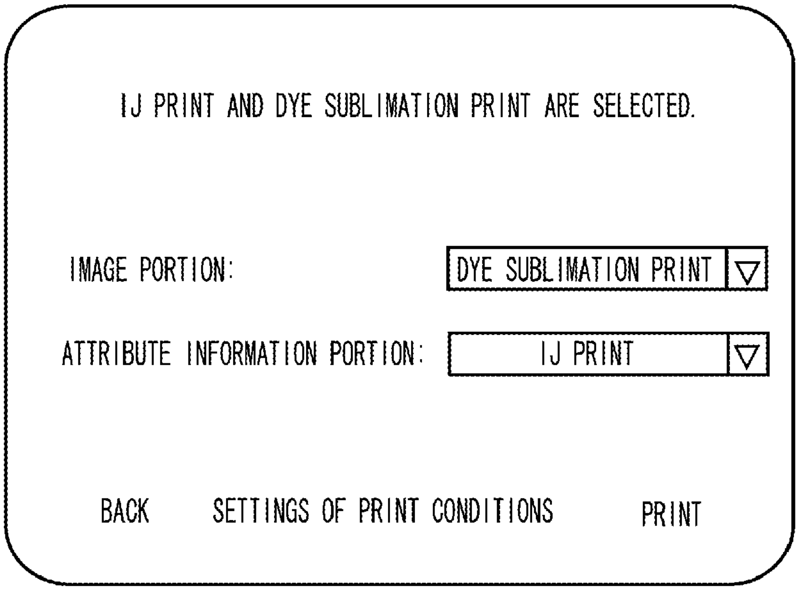
FIG. 13 illustrates an exemplary print mechanism selection screen for each data (or information) portion of a print object according to an aspect of the present invention.

In step S206, the print control apparatus displays a print mechanism selection screen for each data (or information) portion of a print object (refer to FIG. 13). FIG. 13 shows an example that a user of the print control apparatus has selected the dye sublimation print system to print an image portion and selected the IJ print system to print an attribute information portion (character portion) such as date information and a file name to be printed along the edge of an image or in a marginal portion.

The combination shown in FIG. 13 can emphasize the black gradation of an image portion and the accuracy for an attribute information portion. However, the combination of print mechanisms is not limited to the example shown in FIG. 13. To improve the usability, the combination of print mechanisms can be adaptively selected according to the image quality requested by a user.

In step S207, the print control apparatus selects and determines a print mechanism for each data (or information) portion of a print object with reference to user's preference. A user of the print control apparatus can select desirable combination of print mechanisms while viewing an exemplary screen shown in FIG. 13.

In step S208, the print control apparatus displays a print condition setting screen that enables a user to designate print conditions for the selected print mechanisms. In step S209, the print control apparatus selects and determines print conditions (print settings) with reference to user's preference. A user of the print control apparatus can select desirable print conditions while viewing the print condition setting screen.

In step S210, the print control apparatus transmits, to the hybrid printer, the determined print mechanism, print conditions (print settings), and print object images (or documents), and requests the hybrid printer to perform a print operation.

As described above, the third exemplary embodiment enables a user of the print control apparatus to adaptively select plural print systems according to the type of print.

Fourth Exemplary Embodiment

The above-described third exemplary embodiment enables a user of the print control apparatus to select a desirable print mechanism for each data (or information) portion of a print object (refer to steps S205 through S207 of FIG. 11 and FIG. 13).

A fourth exemplary embodiment is characterized in that the print control apparatus can determine a print mechanism for each data (or information) portion of a print object. In the following description, differences between the fourth exemplary embodiment and the above-described exemplary embodiments will be chiefly described.

Figure 14:
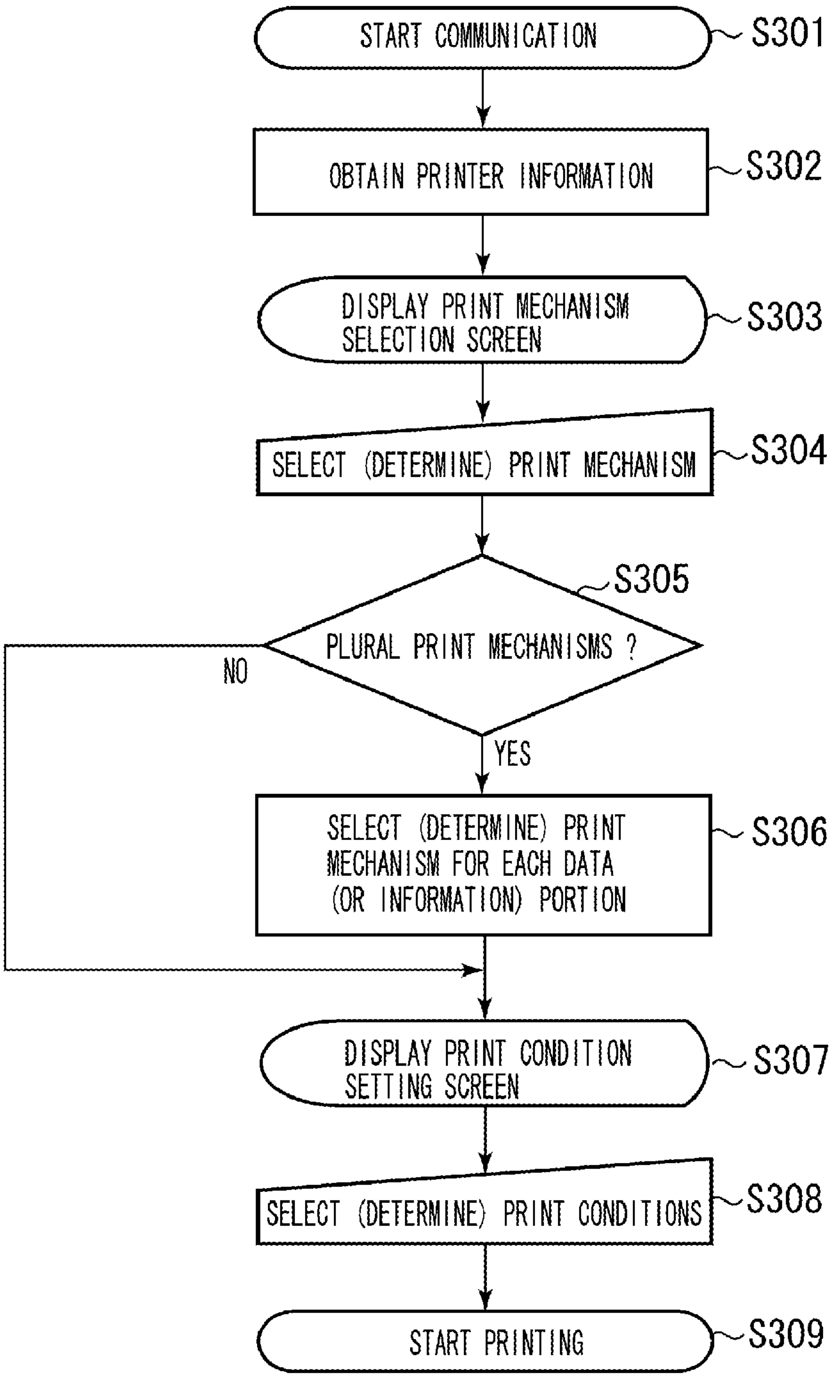
FIG. 14 is a flowchart showing exemplary processing of a microcomputer (print control section) that can control the print control apparatus according to an exemplary embodiment.

FIG. 14 is a flowchart showing an exemplary control of the microcomputer (print control section) that can control the print control apparatus. The processing of steps S301 through step S304 shown in FIG. 14 is similar to the processing of steps S201 through step S204 shown in FIG. 11. In step S305, the print control apparatus determines whether plural print mechanisms are selected in step S304. If plural print mechanisms are selected (i.e., YES in step S305), the processing flow proceeds to step S306. When only one print mechanism is selected (i.e., NO in step S305), the processing flow proceeds to step S307.

Figures 15, 16:
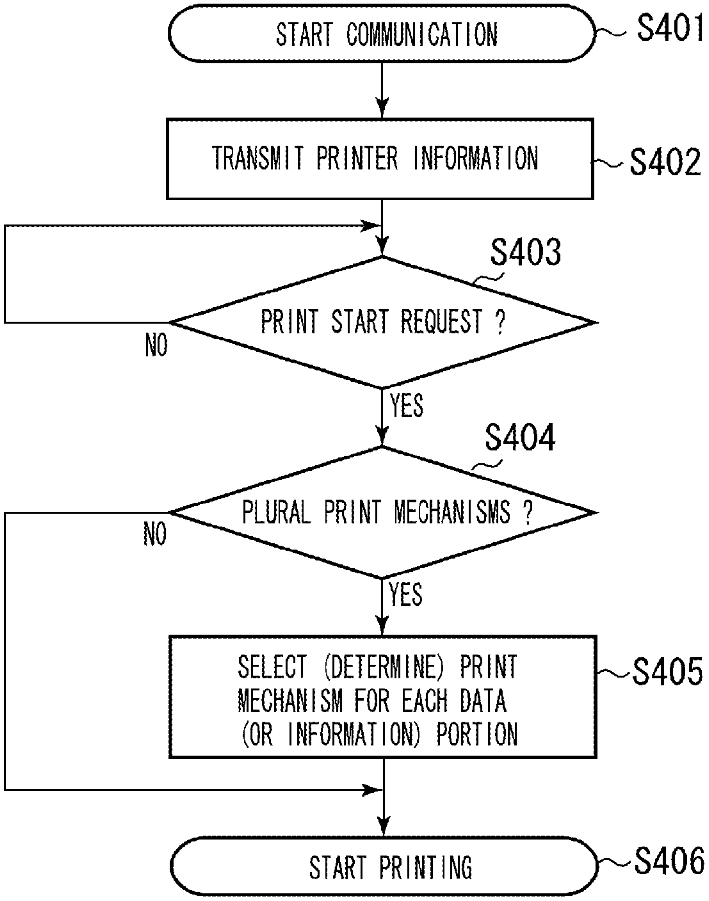
FIG. 15 illustrates an exemplary correspondence table according to an aspect of the present invention.
FIG. 16 is a flowchart showing exemplary processing of a microcomputer that can control the hybrid printer according to an exemplary embodiment.

In step S306, the print control apparatus determines an object data (or information) portion of each usable print mechanism, based on the combination of print mechanisms selected and determined in step S304, with reference to a correspondence table (refer to FIG. 15) stored in the memory. The correspondence table of FIG. 15 shows the correspondence relationship between each combination of print mechanisms and print object data (or information) portions corresponding to the combined print mechanisms.

In step S307, the print control apparatus displays a print condition setting screen that enables a user to designate print conditions for the selected print mechanisms. In step S308, the print control apparatus selects and determines print conditions (print settings) with reference to user's preference. A user of the print control apparatus can select desirable print conditions while viewing the print condition setting screen.

In step S309, the print control apparatus transmits, to the hybrid printer, the determined print mechanism, print conditions (print settings), and print object images (or documents) and requests the hybrid printer to perform a print operation.

Fifth Exemplary Embodiment

A fifth exemplary embodiment is characterized in that the hybrid printer has the correspondence table shown in FIG. 15 and can determine an object data (or information) portion for each usable print mechanism based on the selected combination of print mechanisms.

A flowchart showing the processing of the print control apparatus according to the fifth exemplary embodiment is similar to the processing of the first exemplary embodiment shown in FIG. 5. However, the fifth exemplary embodiment is characterized in that the print control apparatus displays a screen including print conditions (print settings) commonly applicable to plural print mechanisms. For example, the print conditions (print settings) commonly applicable to plural print mechanisms include the print number of copies and type of print papers.

FIG. 16 is a flowchart showing exemplary processing of a microcomputer that can control a hybrid printer. First, step S401 of FIG. 16 is communication start processing including connection of a communication cable, activation of the print control apparatus and the hybrid printer, and selection of communication mode.

In step S402, the hybrid printer communicates with the print control apparatus to transmit, to the print control apparatus, printer information including usable print mechanisms (e.g., laser print, IJ print, and dye sublimation print) that the print control apparatus can designate as well as print conditions (print settings) for each print mechanism that the print control apparatus can designate.

In step S403, the hybrid printer determines whether a print request is received from the print control apparatus. The print request includes print mechanisms, print conditions (print settings), and print object images (or documents) which are determined or designated by the print control apparatus. If a print request is received from the print control apparatus (i.e., YES in step S403) the processing flow proceeds to step S404. When no print request is received (i.e., NO in step S403), hybrid printer repeats the processing of step S403.

In step S404, the hybrid printer determines whether two or more print mechanisms are selected based on the print information involved in the print request received from the print control apparatus. If plural print mechanisms are selected (i.e., YES in step S404), the processing flow proceeds to step S405. When only one print mechanism is selected (i.e., NO in step S404), the processing flow proceeds to step S406.

In step S405, the hybrid printer determines an object data (or information) portion of each usable print mechanism, based on the combination of print mechanisms included in a print request and determined by the print control apparatus, with reference to the correspondence table (refer to FIG. 15) stored in the memory.

In step S406, the hybrid printer starts a print operation based on the print mechanisms, print conditions (print settings), and print object images (or documents).

A flowchart excluding the processing of steps S404 and S405 in FIG. 16 corresponds to the flowchart showing the processing of the hybrid printer in the above-described exemplary embodiments.

As apparent from the foregoing description, the exemplary embodiments of the present invention enable a user of the print control apparatus to arbitrarily select desirable print mechanism(s) among plural print mechanisms of the print apparatus that the print control apparatus can communicate with.

Sixth Exemplary Embodiment

Figure 17:
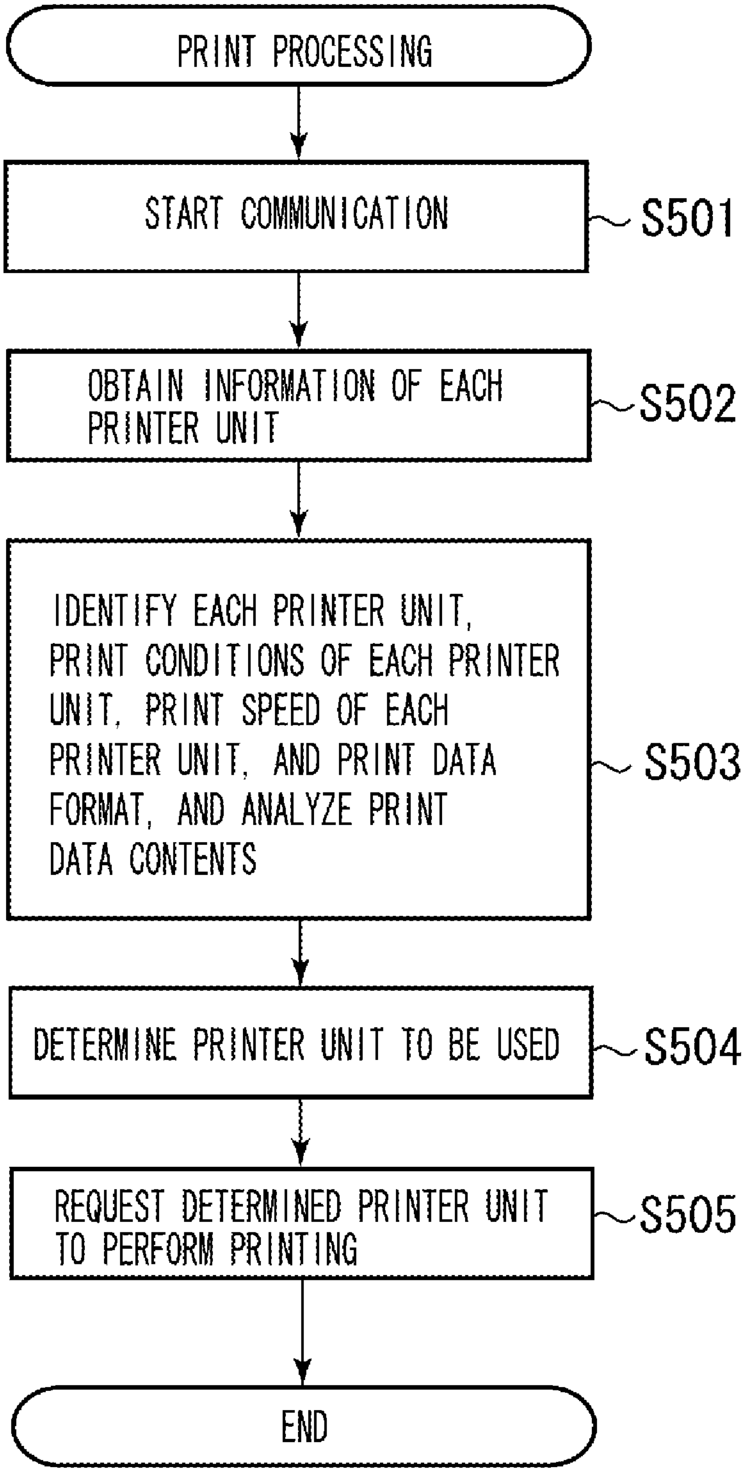
FIG. 17 is a flowchart showing print processing of the camera-integrated VTR executable according to an exemplary embodiment.

FIG. 17 is a flowchart showing print processing of the camera-integrated VTR 101 executable according to the sixth exemplary embodiment. First, step S501 of FIG. 17 is communication start processing including connection of a communication cable, activation of the camera-integrated VTR 101 and the hybrid printer 102, and selection of communication mode.

In step S502, the camera-integrated VTR 101 obtains information of usable printer units (e.g., laser print, IJ print, and dye sublimation print) that the camera-integrated VTR 101 can designate through communications, as well as an action state of each printer (error state, action status, etc), print capability (e.g., print speed, resolution, expressible color space information, printable data format, and file size), and print conditions including print number of copies, print size, and layout.

Alternatively, the camera-integrated VTR 101 can obtain a predetermined code inherent to each printer unit to obtain similar information relating to the connected printer unit.

In step S503, the camera-integrated VTR 101 identifies each printer unit (print mechanism), print conditions of each printer unit (print mechanism), print speed of each printer unit, and print data format, and analyzes print data contents. In step S504, the camera-integrated VTR 101 determines a printer unit to be used based on the processing result.

In step S505, the camera-integrated VTR 101 requests the designated printer unit to perform a print operation. Then, the camera-integrated VTR 101 terminates the processing of this routine. Thus, the print control apparatus according to the sixth exemplary embodiment can automatically determine an optimum print mechanism.

Seventh Exemplary Embodiment

Figure 18:
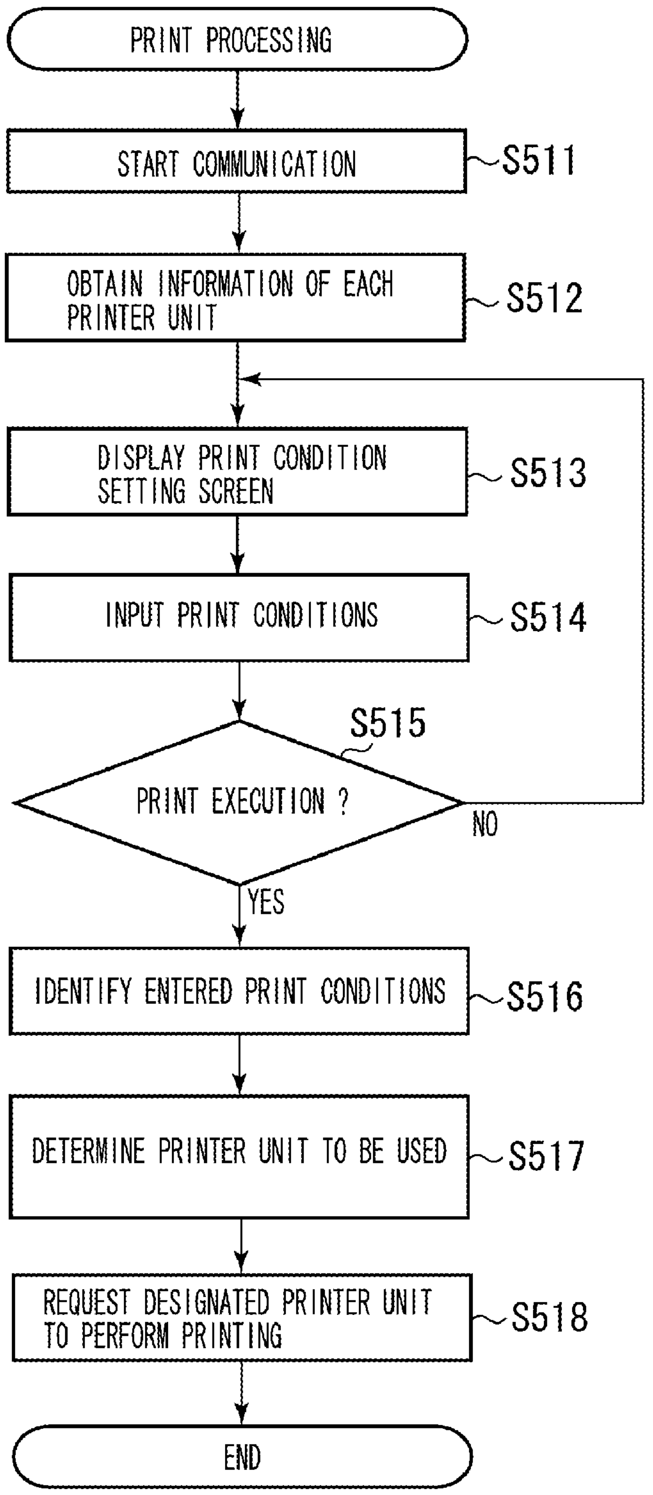
FIG. 18 is a flowchart showing print processing of the camera-integrated VTR executable according to an exemplary embodiment.

FIG. 18 is a flowchart showing exemplary print processing of the camera-integrated VTR 101 executable according to a seventh exemplary embodiment. First, step S511 is communication start processing including connection of a communication cable, activation of the camera-integrated VTR 101 and the hybrid printer 102, and selection of communication mode.

In step S512, the camera-integrated VTR 101 obtains, from the hybrid printer 102, information relating to print conditions (print settings) that the camera-integrated VTR 101 can designate for each printer unit. For example, the print conditions (print settings) include print number of copies, print paper size (print range), print position, print layout, print quality (image quality), print paper type (paper quality), print effect (special effect), and image processing information.

Alternatively, the camera-integrated VTR 101 can obtain a predetermined code inherent to each printer unit to obtain similar information relating to the connected printer unit.

Next, in step S513, the camera-integrated VTR 101 displays a print condition setting item (refer to FIG. 20) including print conditions applicable to the connected printer unit. In step S514, a user can input preferable print conditions (print settings). In step S515, the camera-integrated VTR 101 determines whether a print operation can be executed.

To execute the processing of steps S514 and S515, a user can select items and input instructs using the buttons (refer to FIG. 8) of the camera-integrated VTR 101. A user can press the SET button 501 shown in FIG. 8 to determine in steps S514 and S515, and can press the direction buttons 502 through 505 to shift a UI cursor on the display screen shown in FIG. 20 to select other value or option in a state that the cursor is put on each setting item shown in the screen of FIG. 20. The camera-integrated VTR 101 displays other setting values or options in accordance with the user's designation through the direction buttons 504 or 505.

Figure 20:
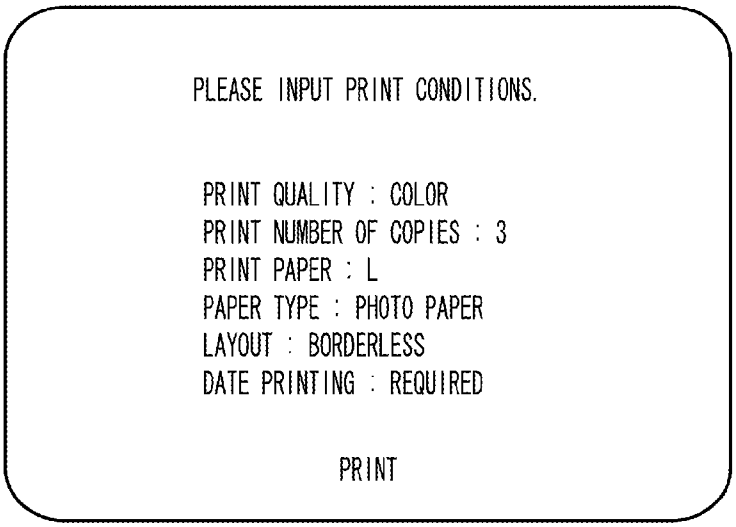
FIG. 20 illustrates print mechanism related items displayed in step S513 of FIG. 18 according to an aspect of the present invention.

If the print operation cannot be executed (i.e., NO in step S515), the processing flow returns to step S513 to again display the print condition setting screen (refer to FIG. 20). When the print operation can be executed (i.e., YES in step S515), the camera-integrated VTR 101 identifies entered print conditions (print settings) in step S516.

Then, in step S517, the camera-integrated VTR 101 determines a printer unit to be used based on the print conditions. In step S518, the camera-integrated VTR 101 requests the designated printer to perform a print operation and then terminates the processing of this routine.

Thus, the print control apparatus according to the seventh exemplary embodiment can automatically determine a print mechanism to be used for print based on the print conditions selected by a user.

Eighth Exemplary Embodiment

Figure 19:
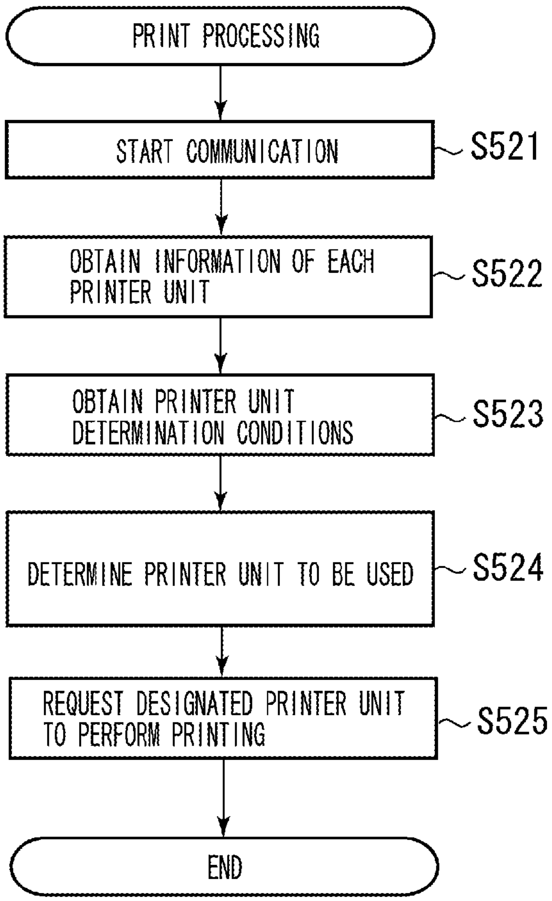
FIG. 19 is a flowchart showing print processing of the camera-integrated VTR executable according to an exemplary embodiment.

FIG. 19 is a flowchart showing exemplary print processing of the camera-integrated VTR 101 executable according to an eighth exemplary embodiment. First, step S521 of FIG. 19 is communication start processing including connection of a communication cable, activation of the camera-integrated VTR 101 and the hybrid printer 102, and selection of communication mode.

In step S522, the camera-integrated VTR 101 obtains information relating to each printer unit that the camera-integrated VTR 101 can designate for printing through communications. The information relating to each printer unit includes usable print mechanism (e.g., laser print, IJ print, or dye sublimation print), action state (error state, action status, etc), print capability (print speed, resolution, expressible color space information, printable data format, and file size).

Alternatively, the camera-integrated VTR 101 can obtain a predetermined code inherent to each printer unit to identify similar information relating to the connected printer unit.

Figure 21:
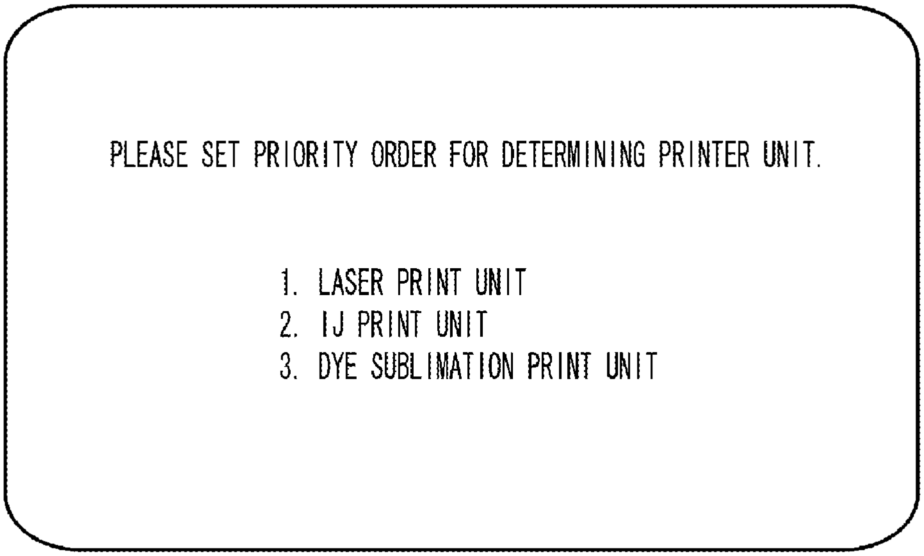
FIG. 21 illustrates the priority order of print mechanisms obtained in step S522 of FIG. 19 according to an aspect of the present invention.

Next, in step S523, the camera-integrated VTR 101 obtains a priority relationship applicable to print mechanisms (refer to FIG. 21). In step S524, with reference to the priority order, the camera-integrated VTR 101 determines a printer unit to be designated based on the print mechanism information. In step S525, the camera-integrated VTR 101 requests the designated printer unit to perform a print operation and then terminates the processing of this routine.

Thus, the print control apparatus according to the eighth exemplary embodiment can automatically determine a print mechanism to be used for printing based on printer unit determination conditions set by a user.

Other Exemplary Embodiments

Although the present invention has been described with reference to the exemplary embodiments, the present invention is not limited to the specific exemplary embodiments and can be variously modified within the scope of the present invention defined in the following claims.

For example, in the aforementioned exemplary embodiments, the print control apparatus obtains the information of each print mechanism usable in the hybrid printer and corresponding print conditions (print settings) in the same step. However, the print control apparatus can separately obtain, from the hybrid printer, the information relating to each print mechanism and the information relating to the print conditions (print settings), if desirable.

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses the means for supplying the program code to a computer, such as a storage (or recording) medium storing the program code. In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Moreover, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Additionally, an operating system (OS) or other application software running on the computer can execute part or all of the actual processing based on instructions of the programs.

Also, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-002942 filed Jan. 10, 2006 and Japanese Patent Application No. 2006-163860 filed Jun. 13, 2006, which are hereby incorporated by reference herein in its entirety.

What is claimed:

1. A print control apparatus for controlling a print operation of a print apparatus, the print control apparatus comprising:

a communication unit configured to communicate with the print apparatus, wherein the print apparatus includes a plurality of print mechanisms, wherein each print mechanism includes a printing system that is different from other printing systems of the plurality of print mechanisms and is for printing on a recording paper, and wherein the print apparatus is configured to print both characters and images on a surface of one recording paper;

a selecting unit configured to permit a user to select one print mechanism or plural print mechanisms from among the plurality of print mechanisms to be used to perform a print operation, wherein, in response to a selection of plural print mechanisms to perform a print operation, the selecting unit further permits the user to select a print mechanism for printing characters from among the plurality of print mechanisms and to select a print mechanism for printing the images from among the plurality of print mechanisms, wherein the selecting of a print mechanism for printing characters is independent of the selecting a print mechanism for printing images; and a controlling unit configured to control the plurality of print mechanisms and perform the print operation in response to the selecting of print mechanism by the selecting unit.

2. The print control apparatus according to claim 1, wherein the plurality of print mechanisms includes at least two print mechanisms from the following: an inkjet printer mechanism, a dye sublimation printer mechanism, and a laser printer mechanism.

3. The print control apparatus according to claim 1, wherein the selecting unit displays a print system setting screen for setting the print mechanism on a display unit.

4. The print control apparatus according to claim 3, wherein the print system setting screen presents an option to select the printing system used for the print operation.

5. The print control apparatus according to claim 1, wherein the plurality of print mechanisms includes at least three print mechanisms and the selecting unit further is configured to permit a user to select various combinations of two print mechanisms from the plurality of print mechanisms to perform a print operation, wherein, in response to a selection of a combination of two print mechanisms to perform a print operation, the selecting unit allocates one print mechanism as the print mechanism for printing characters and the other print mechanism for printing the images, and wherein the selecting unit further permits the user to select or change the allocated print mechanism for printing characters and select or change the allocated print mechanism for printing the images, wherein the selecting or changing of a print mechanism for printing characters is independent the selecting or changing a print mechanism for printing images.

6. A method used in a print control apparatus for controlling a print operation of a print apparatus, the method comprising:

communicating, using a central processing unit, with the print apparatus, wherein the print apparatus includes a plurality of print mechanisms, wherein each print mechanism includes a printing system that is different from other printing systems of the plurality of print mechanisms and is for printing on a recording paper, and wherein the print apparatus is configured to print both characters and images on a surface of one recording paper;

permitting a user to select one print mechanism or plural print mechanisms from among the plurality of print mechanisms to be used to perform a print operation, wherein, in response to a selection of plural print mechanisms to perform a print operation, permitting further includes permitting the user to select a print mechanism for printing characters from among the plurality of print mechanisms and to select a print mechanism for printing the images from among the plurality of print mechanisms, wherein the selecting of a print mechanism for printing characters is independent of the selecting a print mechanism for printing images; and controlling the plurality of print mechanisms and performing the print operation in response to the selecting of print mechanism.

7. A non-transitory storage medium, readable by a computer, storing a program that causes a print control apparatus to perform the method according to claim 6.

* * * * *